(12) United States Patent
Sachakov et al.

(10) Patent No.: US 10,273,713 B2
(45) Date of Patent: Apr. 30, 2019

(54) FENCE POST ENHANCEMENT APPARATUS AND METHOD

(71) Applicants: Nisimhai Sachakov, Holmes, NY (US); Christina Sachakov, Holmes, NY (US)

(72) Inventors: Nisimhai Sachakov, Holmes, NY (US); Christina Sachakov, Holmes, NY (US)

(*) Notice: Subject to any disclaimer, the term of this patent is extended or adjusted under 35 U.S.C. 154(b) by 0 days.

(21) Appl. No.: 15/593,738

(22) Filed: May 12, 2017

(65) Prior Publication Data
US 2018/0328074 A1    Nov. 15, 2018

(51) Int. Cl.
| F21V 33/00 | (2006.01) |
| E04H 17/20 | (2006.01) |
| A01M 29/12 | (2011.01) |
| E04H 17/00 | (2006.01) |

(52) U.S. Cl.
CPC ........... *E04H 17/20* (2013.01); *A01M 29/12* (2013.01); *F21V 33/006* (2013.01); *E04H 2017/006* (2013.01)

(58) Field of Classification Search
CPC .............. E04H 17/20; E04H 2017/006; Y10T 29/49631; Y10T 29/49826
See application file for complete search history.

(56) References Cited

U.S. PATENT DOCUMENTS

| 5,332,196 A * | 7/1994 | Wright .................... E04H 17/06 116/173 |
| 5,800,099 A * | 9/1998 | Cooper ................. B23B 47/281 408/1 R |
| 6,857,830 B2 * | 2/2005 | Holcomb ................ B23B 49/02 408/115 R |
| 8,844,907 B1 * | 9/2014 | Davis ...................... E04H 17/20 256/1 |
| 2011/0198551 A1 * | 8/2011 | Howard .................... F23D 3/18 256/59 |

* cited by examiner

*Primary Examiner* — Jason L Vaughan
*Assistant Examiner* — Amanda J Meneghini
(74) *Attorney, Agent, or Firm* — Heslin Rothenberg Farley & Mesiti P.C.

(57) ABSTRACT

A modified fence post and a method for modifying the fence post include modifying the fence post to accommodate an object, including placing a guide around a fence post to locate the center of first surface of a fence post. Based on locating the center, the method include drilling a hole in a portion of the designated center of the fence post using a hole saw. The method includes inserting a spacer with an opening in the center of the spacer into the resultant hole and inserting an object into the spacer.

11 Claims, 9 Drawing Sheets

FENCE POST ENHANCEMENT APPARATUS AND METHOD

FIELD OF INVENTION

The invention relates to utilizing specialized tools and method to add enhancements to posts of fences.

BACKGROUND OF INVENTION

Customizations to outdoor fencing, including fencing utilized for decks, can be expensive. Maintaining the dual challenges of having an aesthetically pleasing barrier that is also effective can be costly. Customizations to fences can be cost prohibitive. Fences are often used around porches and decks and when enjoying the outdoors on these decks, insects and pests can interrupt an otherwise enjoyable and leisurely time.

SUMMARY OF INVENTION

Shortcomings of the prior art are also overcome and additional advantages are provided through the provision of a method for customizing a fence post such that it can accommodate an object and maintain its aesthetic appeal. The method may include placing a guide around a fence post to locate the center of a fence post, based on locating the center, drilling a hole in the fence post using a hole saw, inserting a spacer with a hole in the center into the resultant hole, and inserting a chosen device into the spacer. When the inserted device is not in use, the method may further include extracting the device from the spacer and placing a cap over the hole. In some embodiments of the present invention, the object is inserted into the hole in the post without placing the spacer. In another embodiment of the present invention, the hole is made in a cap that is placed atop of the post, rather than in the post itself. In certain embodiments of the present invention, a hold is created in both the post and the cap. In some embodiments of the present invention, whether a hole is drilled in a fence post, a cap and a fence post, or just the cap can depend upon the material and consistency of the cap and/or post. For example, in some embodiments of the present invention, a hole is drilled in both the cap and the post is the post is made out of wood (or a wood-based composite) or filled with concrete). I some embodiments of the present invention when the fence post is hollow, a hole is drilled in just the cap. If the fence post does not include a cap, a hole is drilled in the post, only.

Shortcomings of the prior art are also overcome and additional advantages are provided through the provision of a modified fence post. The modified fence post is configured to allow the insertion of an object and to hold this object securely in a manner that preserves the utility and aesthetics of the fence post. Thus, the modified fence post include an opening with a spacer situated in the opening. The center of the spacer is a circular hole into which a device, such as a citronella torch, can be inserted. The modified fence post also includes a cap that can be placed over the hole when the spacer is not in use. In some embodiments of the present invention, a hole is formed in a cap that sits atop the fence post, rather than in the post itself. In some embodiments of the present invention, no spacer is utilized in the fence post for insertion of the object. In an embodiment of the present invention, the object is a torch utilized for pest prevention.

Additional features are realized through the techniques of the present invention. Other embodiments and aspects of the invention are described in detail herein and are considered a part of the claimed invention.

BRIEF DESCRIPTION OF DRAWINGS

One or more aspects of the present invention are particularly pointed out and distinctly claimed as examples in the claims at the conclusion of the specification. The foregoing and objects, features, and advantages of one or more aspects of the invention are apparent from the following detailed description taken in conjunction with the accompanying drawings.

DETAILED DESCRIPTION OF THE INVENTION

Figure 1:
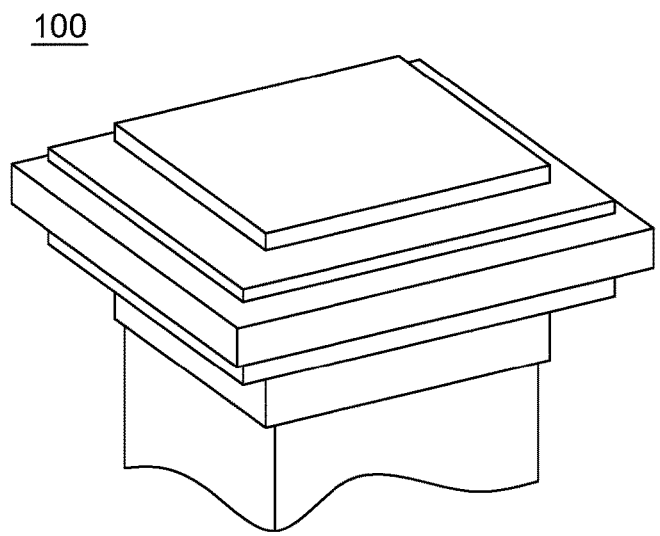
FIG. 1 depicts a fence post.

Aspects of the present invention and certain features, advantages, and details thereof, are explained more fully below with reference to the non-limiting examples illustrated in the accompanying drawings. Descriptions of well-known materials, fabrication tools, processing techniques, etc., are omitted so as not to unnecessarily obscure the invention in detail. It should be understood, however, that the detailed description and the specific examples, while indicating aspects of the invention, are given by way of illustration only, and not by way of limitation. Various substitutions, modifications, additions, and/or arrangements, within the spirit and/or scope of the underlying inventive concepts will be apparent to those skilled in the art from this disclosure.

The fencing industry provides various custom fencing and deck solutions that can be expensive when aesthetically pleasing. Many people opt to pay large sums of money to have a custom deck created and then cannot enjoy the deck because of environmental conditions. One challenge in certain climates is pest control. Embodiments of the present invention enable an individual deck owner to modify fence posts of an existing deck in a manner that maintains the aesthetics of the deck, but also provides pest control, when needed. The receiving openings created in embodiments of the present invention to receive off-the-shelf pest control solutions, such as citronella torches, can also be utilized to add other features to an existing deck. In some embodiments of the present invention, items that are supported by the modified fence post include, but are not limited to, solar panels and lighting fixtures. As understood by one of skill in the art, modifying a post in accordance with aspects of embodiments of the present invention provides an individual with a sturdy support (opening) that can be utilized for a wide variety of objects that can enhance the aesthetic and utility value of the post.

An advantage of utilizing the methods and apparatuses described herein to create receiving openings in fence posts is that embodiments of the present invention also create the flexibility of restoring the fence post to its aesthetic appearance when the openings are not in use. Embodiments of the present invention also include the modified fence posts themselves, which add utility to decks and fences, as a whole.

Throughout this application, the term "fence post" is used broadly to describe a post in a barrier (e.g., wall, railing, gate, fence, etc.) or a free-standing post (e.g., a mailbox post). For ease of understanding and for illustrative purposes, many illustrations situate a fence post on fence, however, aspects of the present invention can be applied to any barrier or post, as understood by one of skill in the art.

As will be described herein, embodiments of the present invention include: 1) a modified fence post that is configured to receive a device, such as a citronella torch, into a specialized opening, and then can be reconfigured to conceal this feature from view; and 2) a method for creating the modified fence post.

Figure 2:
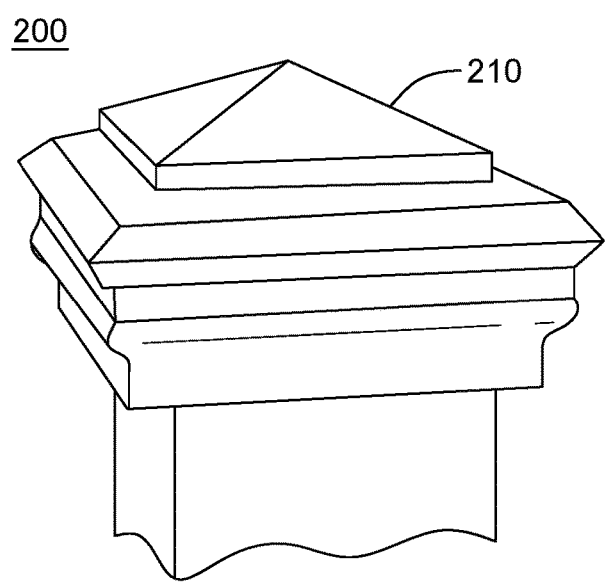
FIG. 2 depicts a fence post that was modified in accordance with aspects of an embodiment of the present invention.

FIG. 1 is a fence post 100 of a standard deck that can be modified in accordance with aspects of embodiments of the present invention. As will be noticed as aspects of the invention are described, the aesthetic appearance of the fence post 100 is only minimally altered when modified with specialized tools to accommodate enhancements. For contrast, FIG. 2 shows a fence post 200 that has been modified in accordance with an embodiment of the present invention. The fence post 200 of FIG. 2 still maintains its aesthetic appeal but now has the flexibility of being able to have devices inserted into the fence post 200, such as illumination devices and pest repellant devices (e.g., citronella torches). The fence post 200 in FIG. 2 includes a cap 210 that sits atop the post that conceals a structure within that is configured to receive an object. As will be discussed in greater detail herein, certain embodiments of the present invention include a hole in a cap on a banister or fence post, some include a hole in the body of the fence post, and others include a hole that pierces both surfaces.

FIG. 1 and FIG. 2 both illustrate fence posts that are rectangular. However, embodiments of the present invention are not limited to this particular implementation. The shape of the fence post may vary provided that an opening can be created in the fence post of the circumference that can accept a spacer (e.g., a circular spacer), which includes an opening in the center of the spacer to accept any item that an individual chooses to situate in a modified fence post. Materials that comprise the spacer may vary, but the term rubber spacer is used throughout as an example to illustrate a possible aspect. The materials selected should be water resistant with some flexibility, such to withstand the force required to situate the spacer in a fence post, in accordance with aspects of embodiment of the present invention described herein. Certain embodiments of the present invention may omit a rubber spacer and thus, an object is inserted directly into a hole.

Figure 8:
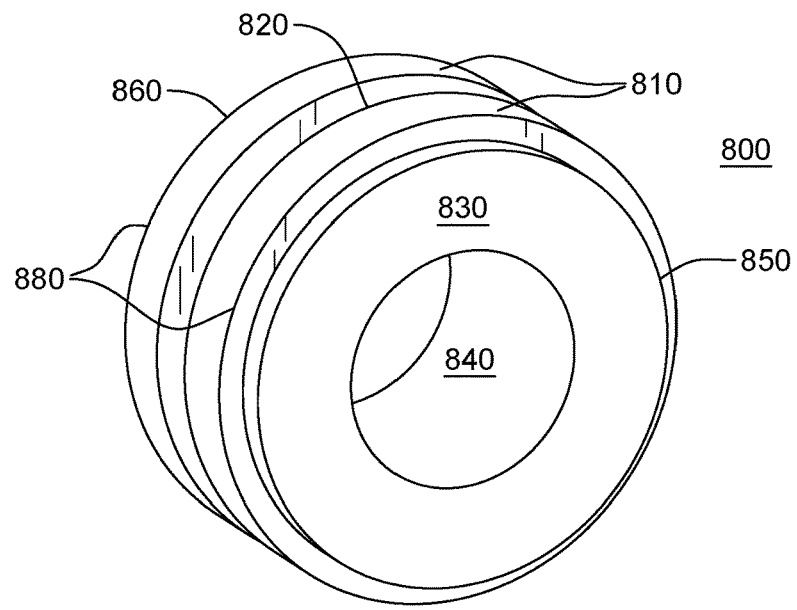
FIG. 8 illustrates a spacer that can be utilized in and embodiment of the present invention.

In modifying a fence post in accordance with aspects of the present invention, a user may decide how to situate a hole in the fence post based on a need to stabilize the object that will be inserted into the hole. For example, if a fence post is hollow, not only would an individual drill a hole in a cap on the post, but the user would insert a spacer into the cap in order to further stabilize the object and prevent it from wiggling or moving in an unintended fashion. FIG. 8, which is described herein, describes certain embodiments of the spacer that can be utilized within a hole in a post (or a cap and/or a post) to stabilize the object placed within. However, as understood by one of skill in the art, the shape and configuration of a spacer can be changed in order to accommodate the hole and the shape of the post into which a user desired to insert an object or device, such as a torch. In some embodiments of the present invention, a fence post is comprised of a 4×4 in a vinyl sleeve. In these embodiments, a user may drill a hole into a cap placed on the fence post and the combination of the cap and the post, which can be drilled into, will stop an object placed into the opening from moving in an unintended manner.

Figure 3:
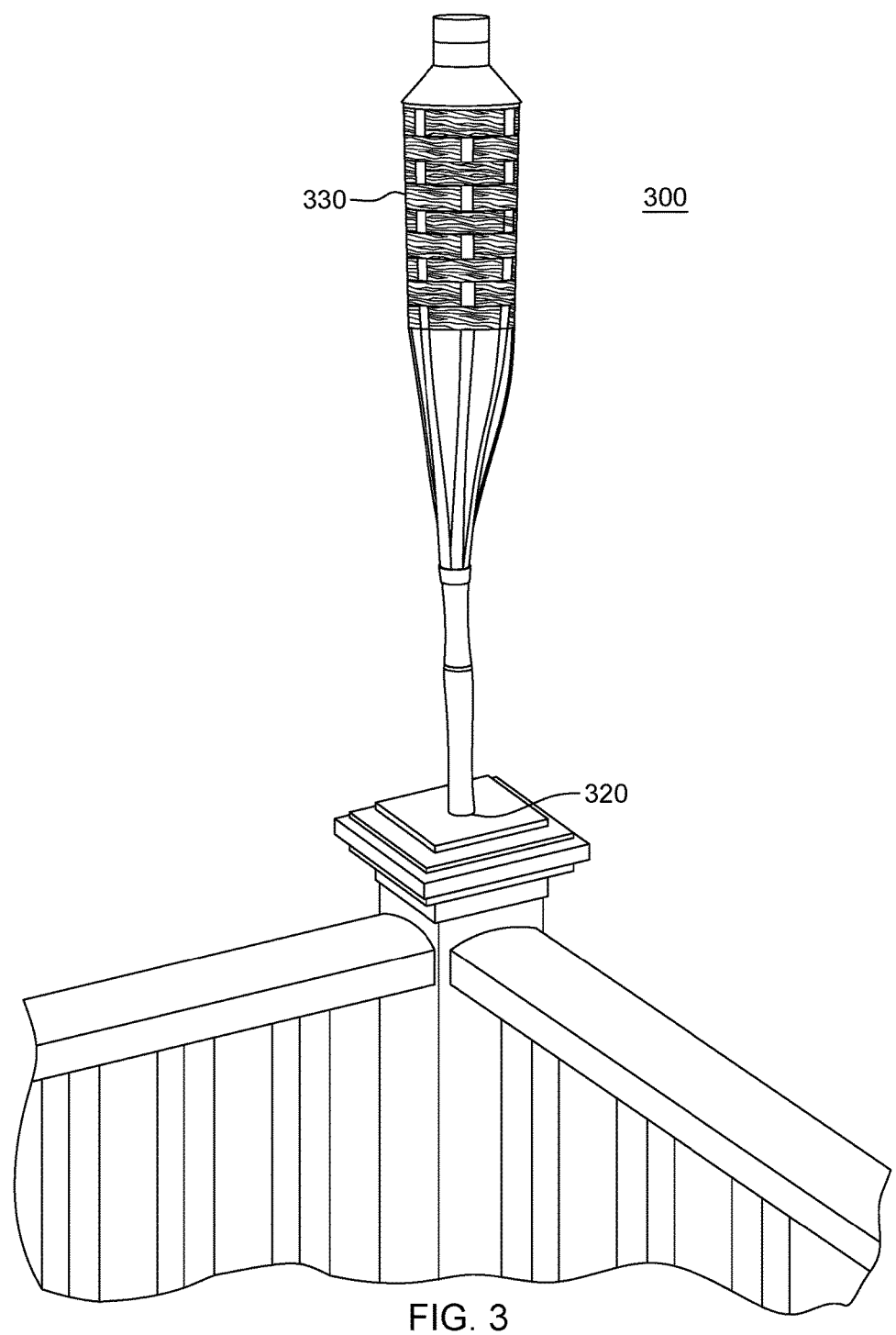
FIG. 3 depicts a fence post that was modified in accordance with aspects of an embodiment of the present invention.
Figure 17:
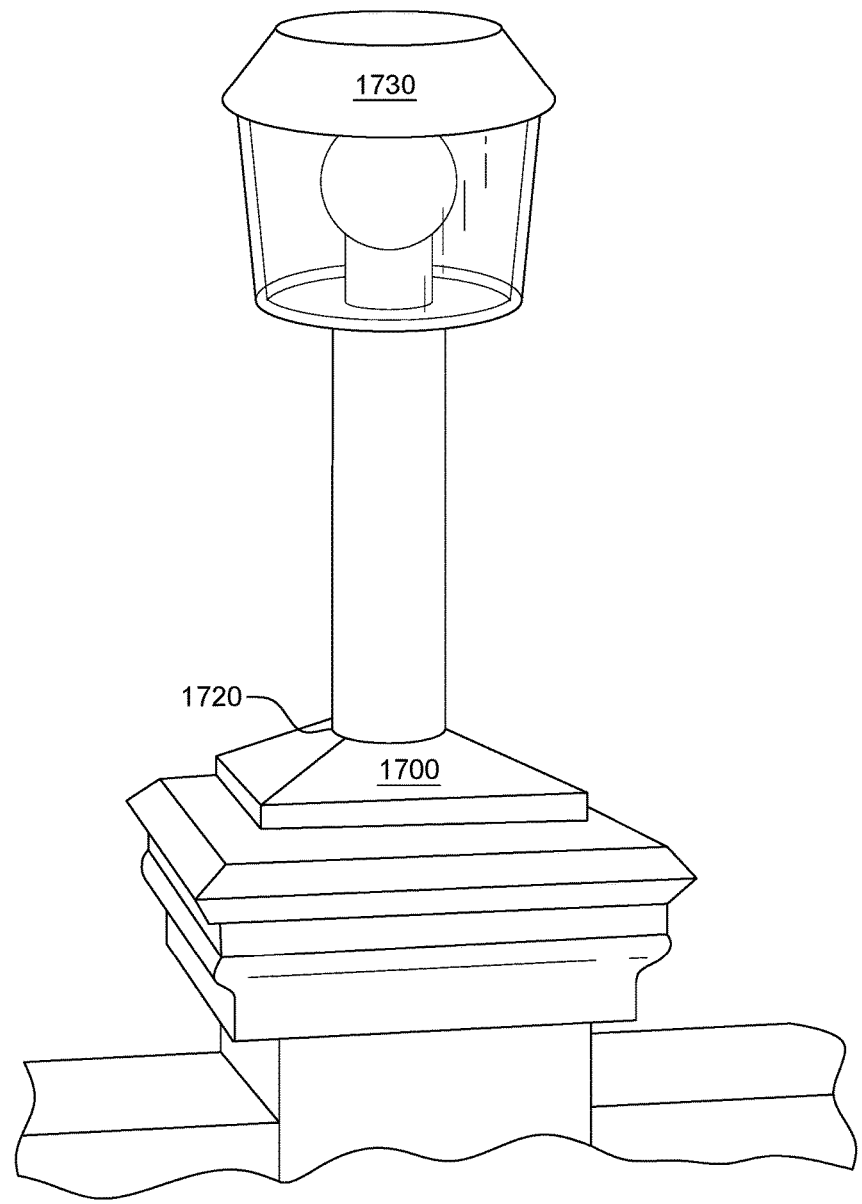
FIG. 17 illustrates certain aspects of embodiments of the present invention.

As aforementioned, embodiments of the present invention include a method of modifying a fence post, for example, of a deck, such that the fence post is able to receive a device, such as a citronella torch, but can then be reconfigured to conceal this enhancement. Thus, the fence post is modified such that it can retain its structural integrity and aesthetic appeal but include this new functionality. FIG. 3 is an illustration of a fence post 300 into which a hole 320 has been drilled, such that a citronella torch 330 is supported in the hole 320. In order to illustrate the wide variety of objects that can be supported by a post that is modified in accordance with embodiments of the present invention, FIG. 17 is provided. FIG. 17 illustrates a fence post 1700 into which an opening 1720 has been drilled (or otherwise created), such that a lighting fixture 1730 can be inserted into the opening 1720 and can add utility to the fence post 1700. FIGS. 3 and 17 provide two examples of objects that can be used to enhance a fence post that has been modified in accordance with an embodiment of the present invention. As understood by one of skill in the art, provided that an object can be inserted into an opening that is created as described herein, it can be utilized in conjunction with an embodiment of the present invention.

Figure 4:
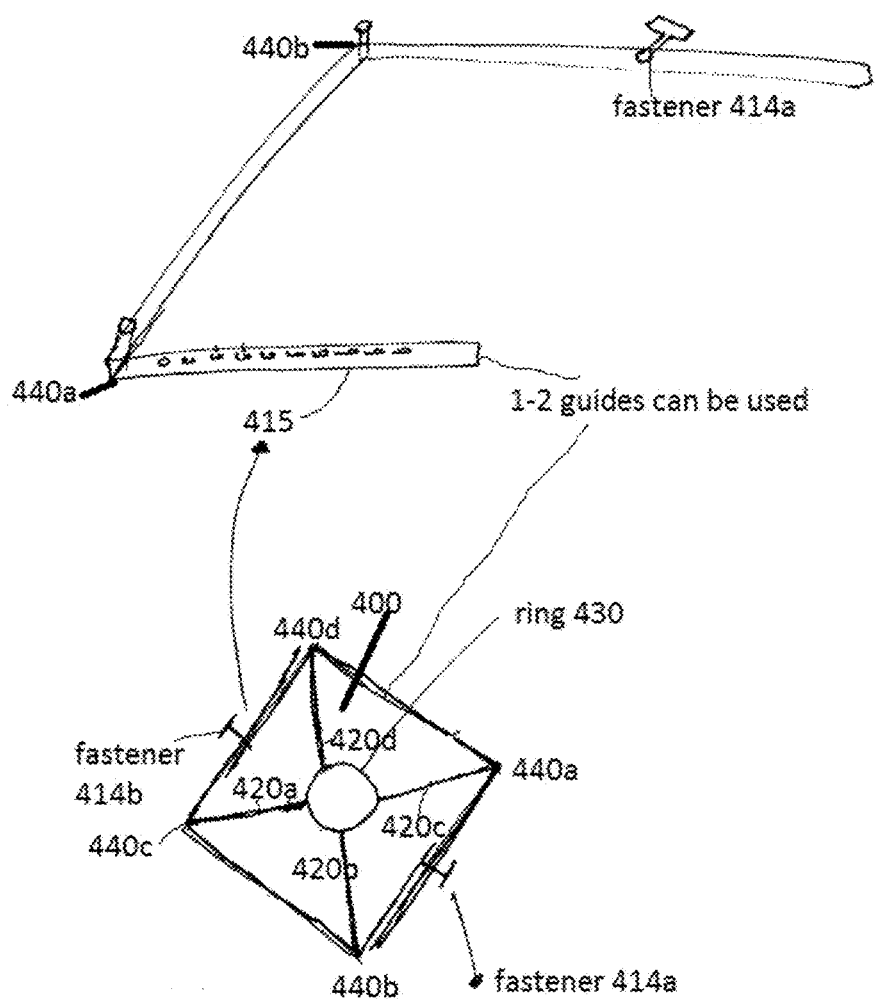
FIG. 4 depicts components of a guide utilized in embodiments of the present invention.

FIG. 4 illustrates aspects of methods utilized in embodiments of the present invention. Referring to FIG. 4, in an embodiment of the present invention, a guide 415 is utilized to center a drill on the top of a fence post 400, which can either be the top of the post itself and/or a cap atop the fence post 400. FIG. 4 depicts the components of a guide utilized in embodiments of the present invention to center the drill on the top of the fence post 400. As seen in FIG. 4, the guide 400 is comprised of: 1) a frame 410 to secure around the periphery of the fence post 400; 2) one or more fasteners 414a-414b to tighten the frame 410 around the periphery of the fence post 400; 3) a group of rods 420a-420d situated at diagonally from the sides of the frame 410, when the frame is placed around the fence post 400; and 4) a ring 430 to hold the rods in the frame and create a target for the drill.

As illustrated in FIG. 4, a frame 410 is situated around the periphery of a fence post 400, such that the frame is rectangular in shape and forms four corners 440a-440d. The frame is tightened around the periphery by utilizing one or more fasteners 414a-414b. At each right angle 440a-440d, a rod 420a-420d at a diagonal orientation, such that each rod 420a-420d extends from a corner at approximately a 44 degree angle from the closest sides of the rectangular frame 410. The rods 420a-420d center a ring 430 at a center of the fence post. The utilization of this structure, including the ring 430 to locate the center of the fence post 400 is done with the described apparatus because the tops of various fence posts that can be modified in accordance with aspects of the present invention vary widely in appearance. The guide is engineered to be useable to assist in modifying a variety of commercially available fence posts. This device may be utilized to make locate the center of one or more of the fence post and/or a cap on top of a fence post.

Figure 5:
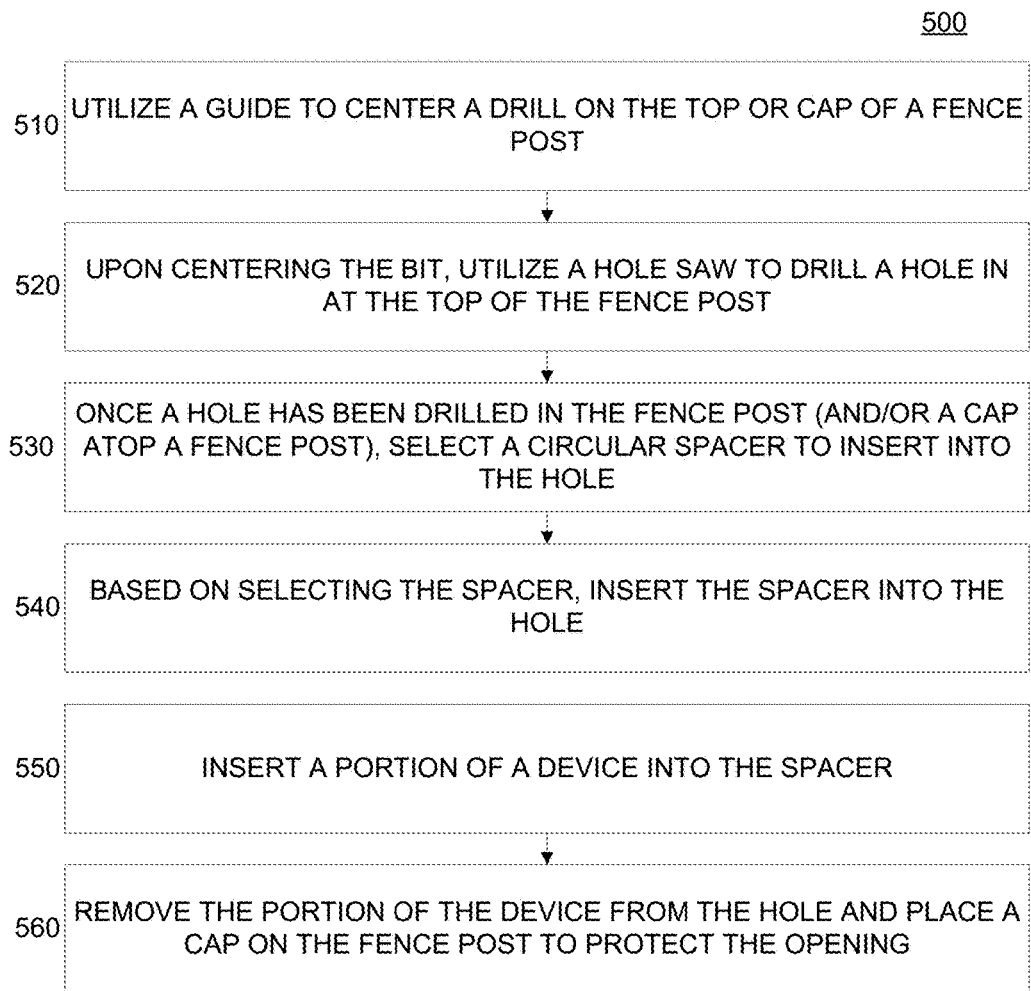
FIG. 5 depicts aspects of a method to modify a fence post in accordance with various aspects of an embodiment of the present invention.

FIG. 5 illustrates aspects of methods utilized in embodiments of the present invention. As illustrated in FIG. 4, in an embodiment of the present invention, a guide is utilized to center a drill on the top (e.g., cap) of a fence post (510). Upon centering the bit, a hole saw is utilized to drill a hole in at the top of the fence post (520). In some embodiments of the present invention, a hole saw is utilized to drill a hole in a cap that is situated at the top of the fence post.

Figure 6:
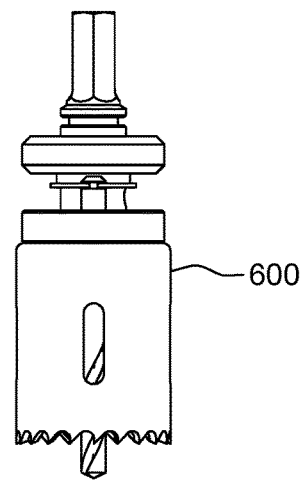
FIG. 6 depicts a hole saw that can be utilized to drill a hole in an embodiment of the present invention.
Figure 7:
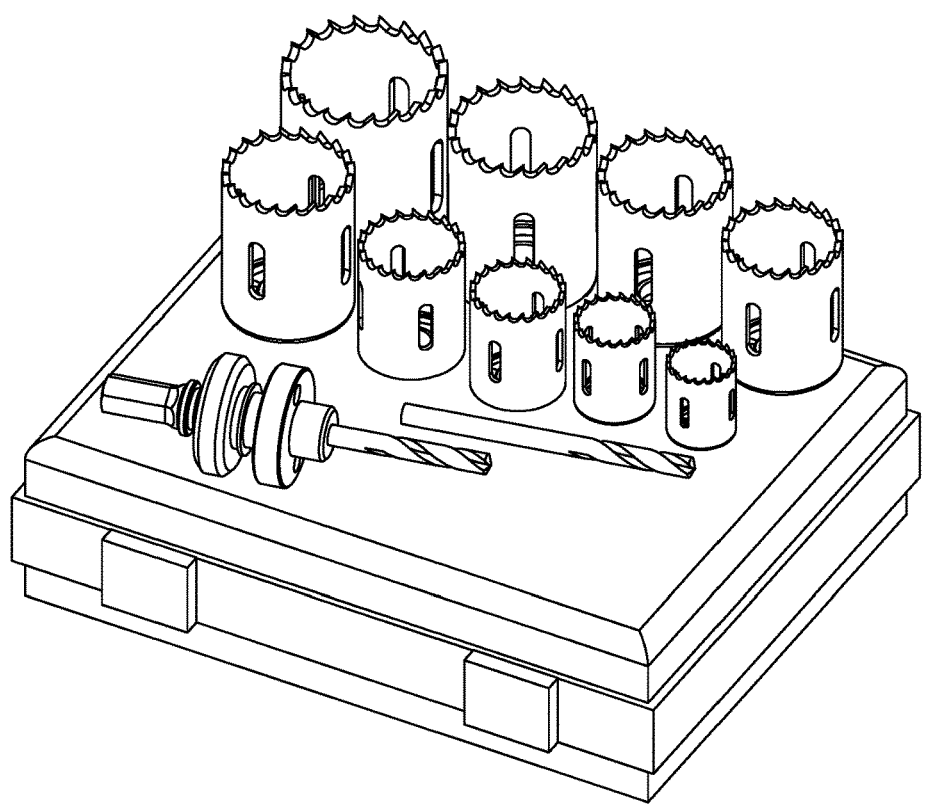
FIG. 7 depicts a hole saw kit that from which component of a hole saw can be selected and assembled to drill a hole in an embodiment of the present invention.

FIG. 6 depicts a hole saw 600 that can be utilized to drill a hole in an embodiment of the present invention. As seen in FIG. 6, a hole saw is a short open cylinder with saw-teeth on the open edge, generally used for making relatively large holes in thin material. They remove material only from the edge of a hole, cutting out an intact disc of material, unlike many drills which remove all material in the interior of the hole. They can be used to make large holes in wood, sheet metal and other materials. In embodiments of the present invention, the hole saw 600 is utilized to make a hole in a fence post that is of sufficient depth to accommodate a rubber spacer. FIG. 7 provides a view of a kit with various hole saws, from which an individual may select depending upon the fence post being modified as well as the size of the rubber spacer (which varies in accordance with the object the hole in the spacer allows the individual to plant in the modified fence post).

Returning to FIG. 5, the size of the hole drilled using the hole saw may vary depending on the size of the fence post and the circumference of the object that will be ultimately inserted in the hole. In an embodiment of the present invention, once a hole has been drilled in the fence post (and/or a cap atop a fence post), an individual selects a circular rubber spacer to insert into the hole (530). The rubber spacer is situated flush to the sides of the hole, leaving the opening in the rubber spacer at the center of the hole. In some embodiments of the present invention, depending on the material that comprises the object into which a hole was drilled, a rubber spacer is not utilized as the hole itself is stable enough to support an object, such as a torch.

FIG. 8 is an example of a rubber spacer 800 that can be utilized in and embodiment of the present invention. As seen in FIG. 8 the spacer 800 is a doughnut shape formed by a ring portion 830 and an opening 840. The shape of a spacer 800 is also similar to that of a washer or a disc. At the orientation shown in FIG. 8, the spacer includes a first side 850 that is parallel to a second side 860. The first side 850 and the second side 860 are situated in the hole drilled in a fence post such that they are situated on a horizontal axis. Thus, one of the first side 850 or the second side 860 is flush to the bottom of the hole drilled. The opening 840 is thus readily available for acceptance of an object. The spacer includes a first circumference 810 and a second circumference 820 around the exterior side 880 of the ring portion 830. The first circumference 810, which is larger than the second circumference 820, is located on portions of the ring 830 that are closest to the first side 850 and the second side 860, perpendicular to these sides. The second circumference 820 is between the portions of the ring of the first circumference 810. This variation in the outer surface circumference of the ring portion 830 of the rubber spacer 800 situates the ring portion 830 of the rubber spacer more firmly in the opening 840 in contrast to an object with a consistent circumference.

Returning to FIG. 5, upon selecting the spacer, an individual may insert the spacer into the hole (540). In an embodiment of the present invention, an individual may insert a device (e.g., a citronella torch) into the rubber spacer, once the rubber spacer is situated in the hole (550). A user may subsequently remove the device from the hole and place a cap on the fence post to protect the opening and maintain the aesthetic appearance of the fence post when the hole is not being used to accept a device (560).

Embodiments of the present invention include novel configurations of modified fence posts that are configured to hold devices, such as citronella torches, and can be reconfigured to hide this functionality and maintain an appearance of an unmodified tent post. As aforementioned, FIG. 2 illustrates how the rubber spacer, which forms a hole that can receive an object, and may be situated in the fence post with or without a positioning reinforcement mechanism (rods and/or fasteners), can be hidden using a cap 210 placed over the drilled hole.

Figure 9:
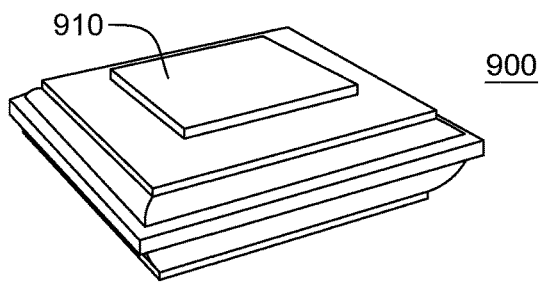
FIG. 9 illustrates certain aspects of embodiments of the present invention.
Figure 10:
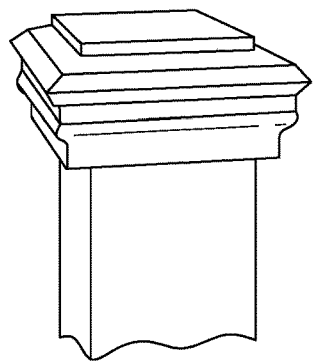
FIG. 10 illustrates certain aspects of embodiments of the present invention.
Figure 11:
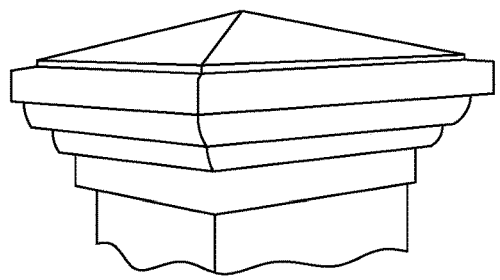
FIG. 11 illustrates certain aspects of embodiments of the present invention.
Figure 12:
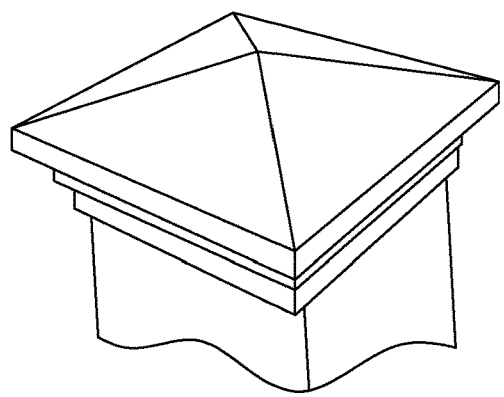
FIG. 12 illustrates certain aspects of embodiments of the present invention.

The appearance of a fence post in embodiments of the present invention can vary as the cap portion that conceals the internal structure (secured rubber spacer) that receives the object can be configured to accommodate different fences and therefore, different aesthetics. FIG. 9 is an example of a fence post 900 that includes a cap 910, where the cap is integrated into the design so it is not easily perceivable. FIGS. 10-12 also show fence posts with different aesthetic features that include a removable cap. Once the cap is removed, the inner structure for receiving an object is exposed.

Figure 13:
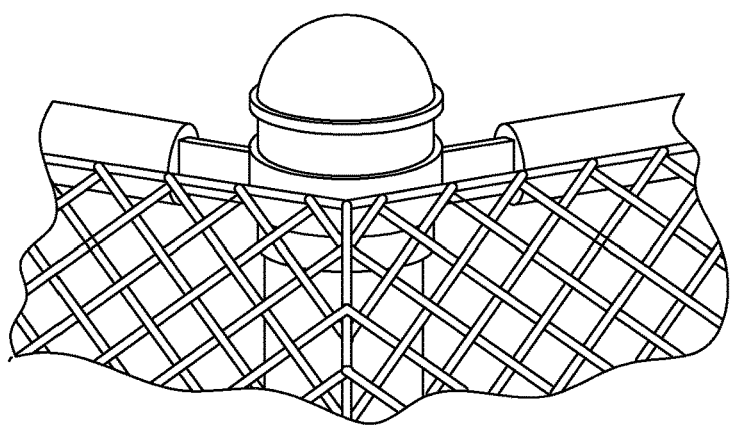
FIG. 13 illustrates certain aspects of embodiments of the present invention.
Figure 14:
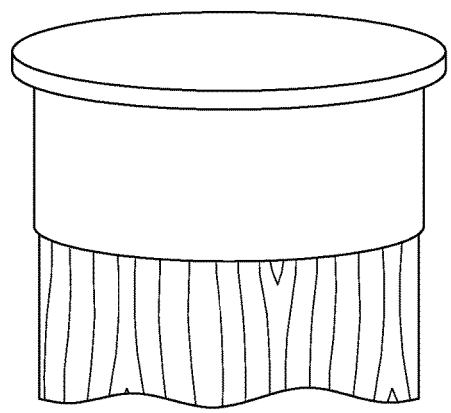
FIG. 14 illustrates certain aspects of embodiments of the present invention.
Figure 15:
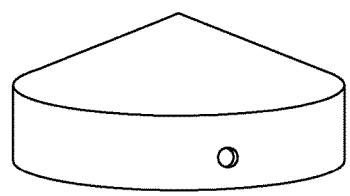
FIG. 15 illustrates certain aspects of embodiments of the present invention.
Figure 16:
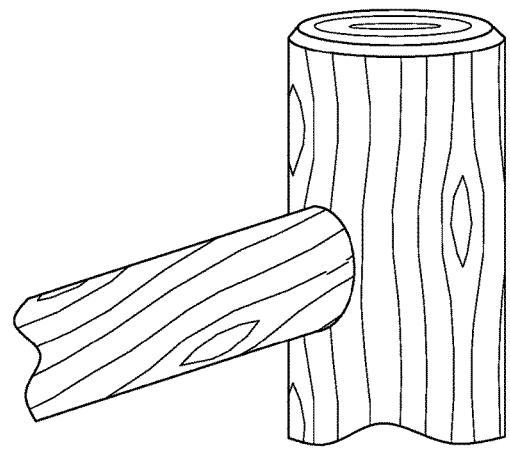
FIG. 16 illustrates certain aspects of embodiments of the present invention.

As explained herein, the implementation of aspects of the present invention are not limited to rectangular fence posts. By way of example, FIGS. 13-16 illustrate additional barriers and posts into which aspects of the present invention can be implements. For example, FIG. 13 is a traditional metal fence post which can be modified in accordance with certain aspects of the present invention. FIG. 14 is a circular wooded post with a copper cap. When modifying FIG. 14, the configuration of the guide can differ but still frame the post and assist a user in locating a center portion of the post 1220 into which an individual can drill a hole. FIG. 15 is a cap that can be drilled when it is atop a fence post, in accordance with certain aspects of the present invention. FIG. 16 is a wooden fence post that can be modified in accordance with aspects described herein of embodiments of the present invention.

Embodiments of the present invention may include kits that include all items that combine all items that are utilized to modify a fence post in accordance with embodiments of the present invention. Making all these materials readily available from a single kit can assist an individual in practicing the methods disclosed herein with ease. Utilizing this kit, an individual can seamlessly: 1) extract and place a guide to locate the center of a fence post; 2) drill a hole in the fence post using a provided hole saw; 3) insert a rubber spacer to match hole desired from the provided rubber spacers; and 4) insert a chosen device into the rubber spacer.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the descriptions below, if any, are intended to include any structure, material, or act for performing the function in combination with other elements as specifically noted. The description of the technique has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for customizing a fence post such that it can accommodate an object, comprising:
    placing a guide around the fence post to locate the center of a first surface of the fence post, wherein the guide comprises a frame comprising one or more rectangular objects, one or more fasteners, four rods, and a ring, the placing the guide comprising:
        placing, around a perimeter of the fence post, wherein the perimeter comprises four additional surfaces, wherein each additional surface of the four additional surfaces is perpendicular to the first surface, the frame comprising the one or more rectangular objects, such that the one or more rectangular objects form a rectangle encircling the perimeter;
        fastening, utilizing the one or more fasteners, the rectangle encircling the perimeter to at least two additional surfaces of the four additional surfaces, wherein based on the fastening comprises tightening the frame to situate each side of the rectangle adjacent to a side of the fence post, wherein each fastener is attached to a side of the rectangle; and
        for each of four corners of the rectangle, placing a first end of a rod of the four rods in the corner of the rectangle and a second end of the rod on a portion of a ring, such that the four rods suspend the ring in a position parallel to the first surface, the position indicating the center of the first surface;
    based on locating the center, drilling a hole in a portion of the designated center of the fence post using a hole saw;
    inserting a spacer with an opening in the center of the spacer into the resultant hole; and
    inserting the object into the spacer.

2. The method of claim 1, the placing further comprising:
    situating, a first portion of the frame on a first horizontal plane above a horizontal plane of any portion of the first surface and a second portion of the frame at a horizontal plane parallel to the first horizontal plane and below the horizontal plane of any portion of the first surface.

3. The method of claim 1, wherein the first surface comprises a top portion of the fence post.

4. The method of claim 1, wherein the first surface comprises a cap fastened to a top portion of the fence post.

5. The method of claim 1, wherein the object comprises a torch.

6. The method of claim 1, further comprising:
    removing the object from the fence post; and
    covering the first surface with a cap to visually conceal the spacer from view.

7. The method of claim 1 wherein the spacer is comprised of rubber.

8. The method of claim 1, wherein the four rods are comprised of plastic.

9. The method of claim 1, wherein the fence post is comprised of material selected from the group consisting of: wood and concrete.

10. The method of claim 9, wherein the portion of the designated center of the fence post comprises a portion of a cap fastened to a top portion of the fence post and a portion of the fence post.

11. The method of claim 1, wherein the fence post is hollow and the portion of the designated center of the fence post comprises a cap fastened to a top portion of the fence post.

* * * * *